Sept. 13, 1927.
J. T. KAMP
1,642,246
EXTENSION GUARD FOR MOWERS
Filed March 17, 1925
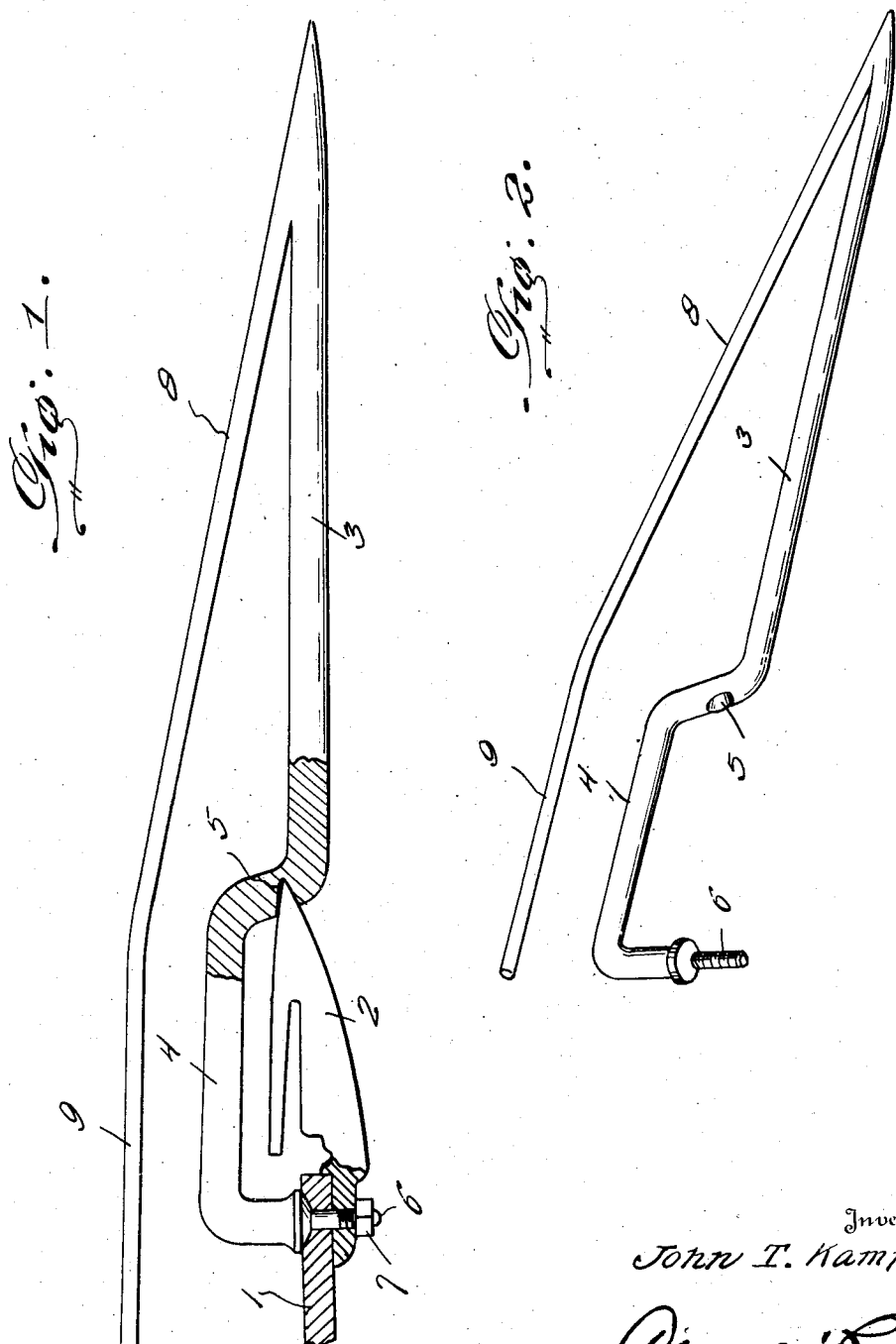
Inventor
John T. Kamp.
By
Attorney Patented Sept. 13, 1927.

1,642,246

UNITED STATES PATENT OFFICE.

JOHN T. KAMP, OF MANHATTAN, MONTANA.

EXTENSION GUARD FOR MOWERS.

Application filed March 17, 1925. Serial No. 16,167.

The present invention appertains to an extension guard for mowers and has for its principal object to provide a simple and efficient structure of this nature which may be easily and quickly attached to a mower for acting as an extension for the guard.

Another important object of the invention is to provide an extension guard of this nature which will be reliable in operation, one which may be manufactured inexpensively, and yet be strong, durable, and well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing;

Figure 1 is a side elevation of the extension guard, showing the same applied to conventional parts of a mower, and Figure 2 is a detail perspective thereof.

Referring to the drawing in detail it will be seen that 1 designates a portion of the frame of a conventional form of mower and 2 the conventional guard thereof. My improved extension guard includes a straight body 3 having its rear end merging into the U-shaped extension 4 having one leg thereof provided with a socket 5, and the terminal of its other leg provided in its rear side with an integrally formed pendent bolt 6 which extends through the portion 1 and the shank of guard 2 for holding the latter on the former by the nut 7 and at the same time holding my extension guard assembled therewith. It is to be noted that the pointed end of the guard 2 seats in the socket 5 so that a rigid mounting is provided for the extension guard. An arm 8 is formed integral with the forward end of the body 3 and inclined upwardly and rearwardly thereover and terminates in the rear horizontal extension 9. It is preferable to construct this extension guard of spring steel, although, of course, other suitable material may be used if desired.

An important feature of my invention will be understood from Figure 1 when it is stated that the rear leg of the guard extension bears at its end in the frame 1, and the guard 2 abuts against the forward edge of the frame 1 so that all strain due to backward thrust on the guard extension is taken off the reduced bolt 6.

It will be apparent from the above that I have devised a very simple extension guard which may be quickly mounted on the guard of a conventional mower so as to be rigid therewith. It will further be apparent that the present embodiment of the invention which I have described in detail has merely been disclosed by way of example and that numerous changes in the details of construction, in the materials, and in the combination and arrangement of parts may be resorted to without departing from the spirit or scope of the invention as hereinafter claimed or sacrificing any of its advantages.

Having thus described my invention, what I claim as new is:—

The combination of a mower frame having a counter sink in its upper side and an aperture extending downwardly from said countersink, a guard abutting against the forward edge of the frame and having an apertured shank disposed below and against the frame, and a guard extension comprising a straight body provided at its rear end with an inverted U-shaped portion, the side of the portion adjacent to the body being provided in its rear side with a tapered socket snugly receiving the forward end of the guard, and the end of the other and rear side of said portion resting in the countersink of the mower frame and terminating in an integral reduced and threaded bolt passing through the apertures in the frame and in the shank of the mower guard, and a nut mounted on the said bolt and disposed below the shank of the guard.

In testimony whereof I affix my signature.

JOHN T. KAMP.